United States Patent Office 3,589,885
Patented June 29, 1971

3,589,885
GLASS MELTING WITH A REFINING AGENT
Joseph R. Monks, Toledo, Ohio, assignor to Owens-Illinois, Inc.
No Drawing. Filed Apr. 7, 1969, Ser. No. 814,181
Int. Cl. C03b 5/16; C03c 3/04
U.S. Cl. 65—134      7 Claims

ABSTRACT OF THE DISCLOSURE

An improved quality glass is produced by employing in the charge of glass-forming ingredients, a small amount of an organic reducing agent which has been impregnated with water soluble sulfates.

---

This invention relates to the manufacture of glass. More particularly, it relates to the production of an improved refining material which is incorporated in the glass batch charge.

As is well known in the manufacture of glass, the desired ingredients such as sand, soda, limestone, fluorspar, feldspar, nepheline syenite, aplite, dolomites, etc. are charged into a furnace and heated whereby certain known chemical reactions take place which convert the raw materials into mutual solutions of silicates and other chemical compounds. In these chemical reactions, as the raw materials are fused, gases are given off which as they proceed upwardly to escape from the solution serve the function of stirring and homogenizing the liquid melt.

Depending upon the formulation or relative proportion of the charge ingredients, a certain temperature level (e.g., 2600° F. to 2950° F.) should be maintained in order to insure homogeneity of the melt and also removal of the gaseous byproducts. Unfortunately, upon further processing of the melt, e.g., passing the melt to the apparatus for shaping and forming into the ultimate article, followed by annealing, it is found that the article contains undesirable "seeds." These "seeds" are very minute gas occlusions which are unsightly and, therefore, undesirable. Also, the "seeds," where excessive, are indicative of a glass which is not as strong as a glass not containing "seeds." More importantly, perhaps, the presence of the "seeds" in the final cooled glass indicates that the melting operation was not carried out satisfactorily. Thus, upon checking the yield of the furnace (weight of glass per unit of time), the fuel consumed, and the corresponding temperatures in the furnace, it is usually found that where "seeds" are found to be present in the ultimate glass article, the glass melting operation was inefficiently carried out. For example, the yield will be low and the fuel consumption high. Obviously, such conditions are reflected in a higher cost and lower quality glass.

The factors which determine the presence or absence of "seeds" are not known with absolute certainty. It is believed that the seed level can be to a certain extent controlled by maintaining a melter temperature at a considerably high value. This, of course, requires fuel and increases the ultimate cost of the melting operation and, consequently, the cost of the glass ultimately formed, whether it be a formed container, sheet glass, fibers, or the like. Additionally, a higher temperature materially reduces the life of the furnace in that the refractory walls, and particularly at the melting line, are attacked at a sharply increasing rate.

It is known that certain finely divided substances, as well as certain elements, can be added to the glass charge ingredients to act as refining or fining agents. By the term "refining" or "fining" agents, is meant those materials which will, in general, lower the seed level in a given glass melt. Certain organic reducing agents, such as finely divided carbon or charcoal, sea coal, sugar, flour, sawdust, etc., are known fining agents. Arsenic is also a known chemical fining agent. These materials, while effective in some degrees, are not completely satisfactory and "seeds" persist despite their use.

Accordingly, with the foregoing background in mind, it is an object of this invention to provide a method of melting glass-forming ingredients to produce a high quality glass.

It is another object of this invention to provide a method for producing a refining agent which has a beneficial effect during the melting operation in reducing "seeds."

Yet another object of this invention is to provide a method of melting glass which is easily carried out in that it does not require any extensive modifications or changes in conventional glass melting apparatus and/or procedures.

What applicant has surprisingly found is that the effectiveness of certain known organic reducing agents, some of which have been employed in the past as refining agents, can be increased and a high quality glass produced by an efficient melting operation. In its simplest manner of expression, the present invention constitutes the discovery that when a sulfate impregnated organic reducing agent is employed in finely divided form, along with the other batch forming ingredients, an improved refining effect will be realized. While applicant does not wish to be restricted to any theory, it seems likely that because of the intimate contact with which the sulfate and organic reducing agent exist, after the sulfate impregnation, small islands of sulfide compounds will be formed very efficiently at an early stage in the melting process by the chemical reduction of the sulfate in the presence of the organic reducing agent. These small islands of sulfide readily, and easily, disperse and mix with the remaining bulk of the glass in the melting furnace to thereby provide an improved glass refinement.

Preferably, the improved refining agent is produced by adding a granulated, or pulverized, porous organic reducing agent, such as, for example, a carbonaceous material, to a sulfate solution; the latter most desirably being an aqueous solution. The sulfate solution, along with the reducing agent which is now dispersed therein, is then dried to form a sulfate impregnated material. This material is then admixed with conventional glass-forming ingredients and fed to a glass melting furnace as an ingredient of the total charge.

As indicated above, the organic reducing agent is preferably a carbonaceous material and, most desirably, will be a porous, granulated material such as coke, charcoal, sea coal, sawdust, or the like. Most desirably, the material will be coke having a particle size of 8 to 100 mesh. The sulfate in solution may be a sulfate of any water-soluble cationic materials; it, of course, being understood that this cation is compatible with the other glass-forming constituents. The sulfate may consequently be an alkali sulfate, such as a sulfate of sodium, potassium or lithium, or, if desired, a water-soluble alkaline earth sulfate or mixtures of alkaline sulfates or alkaline earth sulfates. Most desirably, however, the sulfate will advantageously be a solution consisting of sodium sulfate. The specific concentration of the sulfate solution employed may vary over wide ranges. However, for purposes of economy in the production of the sulfate impregnated carbonaceous material, it is generally preferred that the solution contain at least about ten percent (10%) by weight of the sulfate in solution.

In manufacturing the refining agent having the improved characteristics, the organic reducing agent is added to a preselected sulfate solution. The ratio of the organic reducing agent and the sulfate existing in solution may vary over wide ranges, but it is generally preferred that the organic reducing agent be added in the ratio of about one part to about 10–18 parts of the specific sulfate compound in the water solution. Other ratios may also be employed but it is generally felt to be most desirable that there be a stoichiometric excess of the sulfate compound. After addition of the organic reducing agent to the sulfate solution, the resulting dispersion is mixed for several minutes and then the resulting dispersed mixture is dried. While the drying may be accomplished by many known methods, including filtration and then a drying of the residue, it is generally preferred that the drying step be a direct evaporation of the water existing in the dispersion. That is, the dispersion is directly dried without first removing the water and then drying the residue. Consequently, the preferred mode of drying will be to subject the dispersion to, for example, hot air, or by positioning it in a heated evacuated chamber for a sufficient time to evaporate the water. Particular drying techniques which are advantageously employed in producing the sulfate impregnated organic reducing material, therefore, include such conventional techniques, as vacuum tray drying, rotary drum drying, or even spray drying. Suitable air temperatures which may be employed for purposes of volatilizing the water of the dispersion may be in the range of about 200°–350° F. or even higher.

After the water has been evaporated from the dispersion, there will then remain a dry sulfate impregnated residual material. As used herein, the term "dry" is not intended to be limited to a bone dry condition inasmuch as the residual water content of the sulfate impregnated material may range up to about 5% or even higher. According to the preferred practice of this invention, the residual water content will, however, be less than about one percent. If desired, this material may then be passed through suitable sizing screens or sieves to remove large residual chunks and, preferably, the size of the resulting material will be in the range of about 8–100 mesh prior to its being admixed with the other batch ingredients.

The material as produced above is then added to the other glass-forming ingredients and charged into the furnace for melting. The ratio of the amount of sulfate impregnated material added to the batch may vary over wide ranges but, preferably, this material will be added in the ratio of approximately 0.125–1.0 part by weight per 1,000 parts by weight of sand in the batch composition. As will be readily apparent to those skilled in the art, the invention will be most advantageously practiced by intimately admixing the sulfate impregnated material along with the other glass-forming constituents. This may be done according to techniques well known in the art such as, for example, by blending or mixing in a conventional V-shaped rotary blender.

The following represents a preferred mode of melting glass in accordance with this invention. Into a suitable receptacle there is discharged an aqueous solution of sodium sulfate. The particular solution employed was a water solution of sodium sulfate and contained twenty percent (20%) sodium sulfate by weight (238.3 gms. of sodium sulfate per liter of solution). Sufficient solution is added to a volume of about 1.97 liters. Into this solution there is then added 29.4 gms. of coke having a particle size in the range of 8–100 mesh and the resulting dispersion vigorously agitated for approximately one-half to one hour. The dispersion is then discharged into suitable trays and dried in a conventional vacuum tray drier for a sufficient time to produce a sulfate impregnated coke residue having less than one percent residual moisture. The vacuum tray drier is run at approximately a vacuum of 25 inches of mercury and at a temperature of about 220° F. The dried product is then passed through a four mesh sieve to break up large aggregates.

A conventional flint glass charge was then selected, the composition of which is set forth in Table 1, and the sulfate imgregnated coke refining agent produced as above is added thereto and the resultant admixture blended in a conventional V-shaped rotary mixer.

TABLE 1

| Ingredient: | Amount |
|---|---|
| Sand ___lbs__ | 2220 |
| Soda ash ___lbs__ | 688 |
| Burnt lime (Ca and Mg carbonate) ___lbs__ | 216 |
| Limestone ___lbs__ | 408 |
| Nepheline syenite ___lbs__ | 190 |
| Gypsum ___lbs__ | 24 |
| Fluorspar (65.0% of $CaFl_2$) ___lbs__ | 5.5 |
| Flint cullet ___lbs__ | 700 |
| No. 4 colorizer (3.8% selenium, balance inert) ___ounces__ | 13 |
| No. 1 BMC (2.29% selenium, 0.46% cobalt oxide, 69% $As_2O_3$, balance inert) ___do___ | 13 |

The foregoing charge or batch is then melted in a conventional glass melting furnace and used to make glass articles. The furnace used is a continuous glass melting tank as disclosed in F. V. Tooley, Handbook of Glass Manufacture, Ogden Publishing Company, 2nd Edition, 1957, pp. 140 and 145, in which the melter measured 38 x 21 x 4 ft. and the refiner 27 x 5½ x 3 ft. This furnace had a daily capacity of about 160 tons. A plurality of batches, prepared as set forth above, are then charged at appropriate intervals by means of a conventional feeder into the furnace. The charge is fed on a continuous basis. Generally, during operation, the average temperature of the melter cap or crown was approximately 2750° F. The yield of glass from the furnace is fed to several Owens rotary glass bottle machines and glass articles manufactured therefrom. In addition to the final articles, ladle samples of the glass were removed every four hours and inspected for quality. During this run, it is found that high quality glass, that is, glass having a low seed content, is produced.

While the practice of this invention is of utility in the formation of a numerous variety of high quality glass compositions, the invention is of special utility in the production of flint glass compositions having the general theoretical analysis set forth in Table 2.

TABLE 2

| Oxide: | Percent by weight |
|---|---|
| $SiO_2$ | 60–75 |
| $Al_2O_3$ | .1–10 |
| CaO | 6–14 |
| BaO | 0–1 |
| $B_2O_3$ | 0–5 |
| MgO | 0–8 |
| $Na_2O$ | 10–20 |
| $K_2O$ | 0–3 |

In addition to the foregoing theoretical analysis, the basic batch may include basic colorant ingredients such as oxides of cobalt, sulfur, iron, sodium dichlorate, or the like.

Thus, as is readily apparent, the improved refining agent of this invention is simply manufactured by forming a dispersion of a carbonaceous material in a sulfate solution followed by a drying of the solution. The residual sulfate impregnated carbonaceous material may then be added to a suitable glass charge to realize an improved and unexpected refining effect in the glass production. Most likely, as a result of the intimate contact existing between the carbonaceous material and the sulfate compound with which it has been impregnated, refining sulfide compounds are very efficiently formed during the early stages of the melting and these sulfide compounds are then easily mixed and dispersed within the molten glass to provide the improved refining effect.

Having described the manner and process of making and using the invention and having set forth the best mode contemplated in carrying out this invention, I claim:

1. In a method for reducing the seed content of a glass wherein a carbonaceous material is added to the batch ingredients and the resultant admixture melted, the improvement wherein said carbonaceous material comprises a sulfate impregnated carbonaceous material.

2. In a method for producing glass wherein batch ingredients are combined and melted, the improvement which comprises mixing a porous, sulfate-impregnable carbonaceous material in an aqueous sulfate solution, drying said mixture to produce a sulfate impregnated carbonaceous material, and adding at least a portion of said latter material to the batch ingredients prior to melting.

3. The improvement of claim 2 wherein said sulfate solution comprises a sodium sulfate solution.

4. The improvement of claim 3 wherein said carbonaceous material and said sodium sulfate solution are mixed in the ratio of about one part by weight of said carbonaceous material to about 10–18 parts by weight of sodium sulfate in said solution.

5. A method for producing a relatively colorless silicate glass which comprises: dispersing a sulfate-impregnable carbonaceous material in an alkali-sulfate solution, drying said dispersion to produce a sulfate impregnated carbonaceous material, selecting batch ingredients for said glass, admixing said batch ingredients and at least a portion of said sulfate impregnated carbonaceous material and melting the mixture at a temperature of about 2600° F. to about 2950° F. until molten.

6. The method of claim 5 wherein the batch ingredients are selected to yield a soda-lime silicate glass and said alkali sulfate solution is an aqueous solution of at least one member selected from the group consisting of sodium sulfate and potassium sulfate.

7. The method of claim 6 wherein said batch ingredients and said sulfate impregnated carbonaceous material are admixed in the weight ratio of about 0.125 to about 1 part sulfate impregnated carbonaceous material per 1000 parts of sand in said batch ingredients.

References Cited

UNITED STATES PATENTS

| | | | |
|---|---|---|---|
| 2,014,230 | 9/1935 | Fuwa et al. | 106—52X |
| 2,469,490 | 5/1949 | Armistead | 106—52 |
| 2,672,423 | 3/1954 | Lubdell et al. | 106—52 |
| 2,976,161 | 3/1961 | Smith | 65—134X |
| 3,003,886 | 10/1961 | Pither | 106—52 |
| 3,150,991 | 9/1964 | Monks, Jr. | 65—136X |
| 3,326,702 | 6/1967 | Babcock | 106—52 |
| 3,397,972 | 8/1968 | Brichard et al. | 65—134X |

FRANK W. MIGA, Primary Examiner

U.S. Cl. X.R.

65—136, 32; 106—52